J. E. ADAMS.
TOWEL HOLDER.
APPLICATION FILED OCT. 25, 1913.
1,093,518.
Patented Apr. 14, 1914.
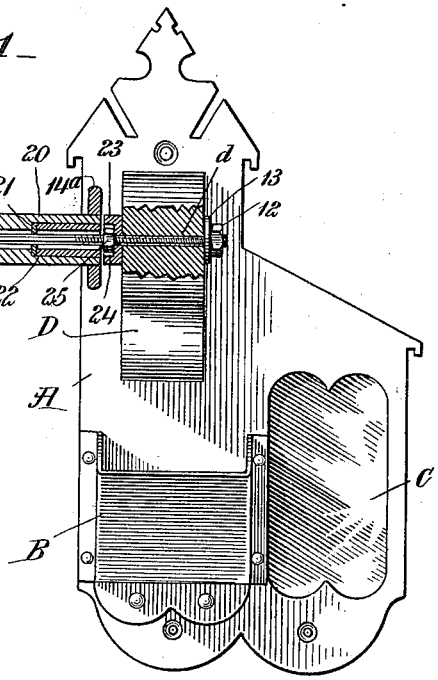
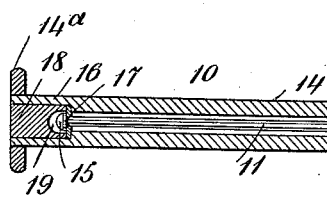
WITNESSES
Frank C. Palmer
INVENTOR
John E. Adams
BY
ATTORNEYS

UNITED STATES PATENT OFFICE.

JOHN EDWARD ADAMS, OF LOVELAND, OHIO.

TOWEL-HOLDER.

1,093,518.

Specification of Letters Patent.

Patented Apr. 14, 1914.

Application filed October 25, 1913. Serial No. 797,230.

*To all whom it may concern:*

Be it known that I, John E. Adams, a citizen of the United States, and a resident of Loveland, in the county of Clermont and State of Ohio, have invented a new and Improved Towel-Holder, of which the following is a full, clear, and exact description.

My invention relates to a towel roller, and particularly to a roller having a novel means for securing the same at one end to a suitable support, there being a novel arrangement of bearings for a core or center rod on which the roller revolves.

The invention will be particularly explained in the specific description following.

Reference is to be had to the accompanying drawings forming a part of this specification, in which similar characters of reference indicate corresponding parts in both views.

Figure 1 is a longitudinal vertical section of a towel holder embodying my invention, showing the same in connection with a fitting adapted to receive toilet articles, with which fitting the roller is associated in practice; and Fig. 2 is a cross section.

The invention is constructed with special reference to a fitting A, adapted to be secured to a wall of a bathroom or a bed room, the fitting comprising a back having a holder B for toilet articles, and a mirror C. On the back is a forwardly projecting bracket D to which my improved towel holder, designated generally by the numeral 10, is applied.

In constructing the towel holder a core 11 is provided, in the form of an elongated rod, preferably of metal, one end of which is passed through a transverse bore $d$ in the bracket D, and is threaded to receive a nut 12 on the end, there being in practice, a washer 13 employed beneath the said nut. On the core 11 a sleeve 14 is fitted, preferably in a way to revolve about the core as an axis. On the end of the core 11 opposite the threaded end and nut 12, a head 15 is formed, which is disposed within an axial mortise or counterbore 16 in the end of the sleeve 14. At the base of the counterbore a ring or washer 17 is fitted, through which the core 11 passes, the head 15 lying adjacent to said ring. The ring 17 forms a bearing for the outer end of the roller sleeve 14. The counterbore or mortise 16 is closed by a plug 18, the inner end of which plug has a concave recess 19 to accommodate the head 15, while the inner end of the plug surrounds said head and presses against the outer face of the ring 17, thereby holding said ring in place. At its opposite end the sleeve 14 has a counterbore 20, in the inner end of which is fitted a ring or washer 21 similar to the ring 17, and through which the core 11 passes, the said ring 21 forming a bearing for the inner end of the roller sleeve 14. The counterbore 20 receives a bushing 22 surrounding the core 11 and bearing by its inner end against the ring 21, to hold the same in place. At the opposite side of the bracket D from the nut 12 and its washer 13, a cup washer 23 fits the core 11, the outer face of the cup washer presenting a mortise or counterbore 24, which receives a nut 25. The arrangement is such that the nuts 12 and 25 at opposite sides of the bracket D serve to bring the washers 13 and 23 into tightly clamped engagement with the bracket, thereby holding the core 11 rigid. The head 15, ring 17 and plug 19 prevent axial movement of the sleeve on the core in an outward direction. The arrangement provides an efficient holding arm for towels, which may be detached from the fitting A for storage or shipping. The roller 14 has preferably end flanges 14$^a$, giving it the form of a spool.

Having thus described my invention, I claim as new and desire to secure by Letters Patent:

1. A towel-holding arm comprising an elongated core, a sleeve on said core, one end of the core terminating short of the outer end of the sleeve, and the opposite end of the core projecting beyond the sleeve, the first mentioned end having a head and the adjacent end of the sleeve having a counterbore, there being a ring in the counterbore adjacent to the head and a plug fitting said counterbore and recessed at its inner end to accommodate the head, the inner end of the said plug bearing against the ring, the projecting end of the core being threaded and having spaced clamp nuts to bind the holder onto a bracket, the end of the sleeve adjacent to the projecting end of the core having a counterbore and there being a ring at the inner end of said counterbore, and a bushing in the counterbore surrounding the core and bearing by its inner end against said ring.

2. A towel-holding arm, comprising an elongated core and a roller sleeve on said core, the core projecting beyond the sleeve at one end and provided with means to secure the core to a support, the ends of the roller having interior bearing rings, there being a member on the outer end of the core adjacent to a bearing ring to prevent longitudinal displacement of the sleeve, and elements fitting the ends of the sleeve outside of the bearing rings, and engaging the latter to hold the same in place.

In testimony whereof I have signed my name to this specification in the presence of two subscribing witnesses.

JOHN EDWARD ADAMS.

Witnesses:
HENRY LEFEBER,
JOHN D. WAKEFIELD.